United States Patent [19]

Moreton

[11] Patent Number: 5,758,557
[45] Date of Patent: Jun. 2, 1998

[54] WOOD CUTTING DEVICE AND METHOD OF USING THE SAME

[76] Inventor: George Moreton, 157 Anchor La., Lexington, N.C. 27292

[21] Appl. No.: 666,022

[22] Filed: Jun. 19, 1996

[51] Int. Cl.[6] ................................. B26D 5/12
[52] U.S. Cl. ........................ 83/36; 83/42; 83/451; 83/467.1; 83/468.3; 83/597; 83/581
[58] Field of Search ................... 83/42, 36, 451, 83/454, 464, 467.1, 468.2, 468.3, 468.7, 597, 673, 675, 483, 490, 607, 608, 782, 581

[56] References Cited

U.S. PATENT DOCUMENTS

| | | | |
|---|---|---|---|
| 2,238,857 | 4/1941 | Ford | 83/468.7 |
| 2,651,333 | 9/1953 | Spinney | 83/454 |
| 2,789,596 | 4/1957 | Barnes et al. | 83/468.3 |
| 2,895,515 | 7/1959 | Ende | 83/468.3 |
| 3,089,373 | 5/1963 | Fischer et al. | 83/597 |
| 3,134,285 | 5/1964 | Greene et al. | 83/607 |
| 3,735,445 | 5/1973 | Jurcak | 83/607 |
| 3,987,694 | 10/1976 | Kaufman | 83/607 |
| 4,510,834 | 4/1985 | Greene et al. | 83/464 |
| 4,651,607 | 3/1987 | Camp | 83/468.2 |
| 5,016,508 | 5/1991 | Hallenbeck | 83/468.3 |
| 5,249,495 | 10/1993 | Renk | 83/468.7 |
| 5,392,677 | 2/1995 | Sevart et al. | 83/468.3 |

*Primary Examiner*—Maurina T. Rachuba
*Attorney, Agent, or Firm*—Kilpatrick Stockton LLP

[57] ABSTRACT

A wood cutting device for safely and easily cutting wood veneer strips into geometric shapes for use in parquetry with high precision. The device includes a rigid base having a top surface, a blade handle rotationally attached to the top surface of the base, a cutting blade affixed to the blade handle, and a strip guide attached to the top surface of the base. The cutting device preferably also includes a strip stop attached to the top surface of the base. The device may be pre-set or adjusted to a particular configuration for repeatedly cutting identical geometric shapes with high precision.

38 Claims, 3 Drawing Sheets

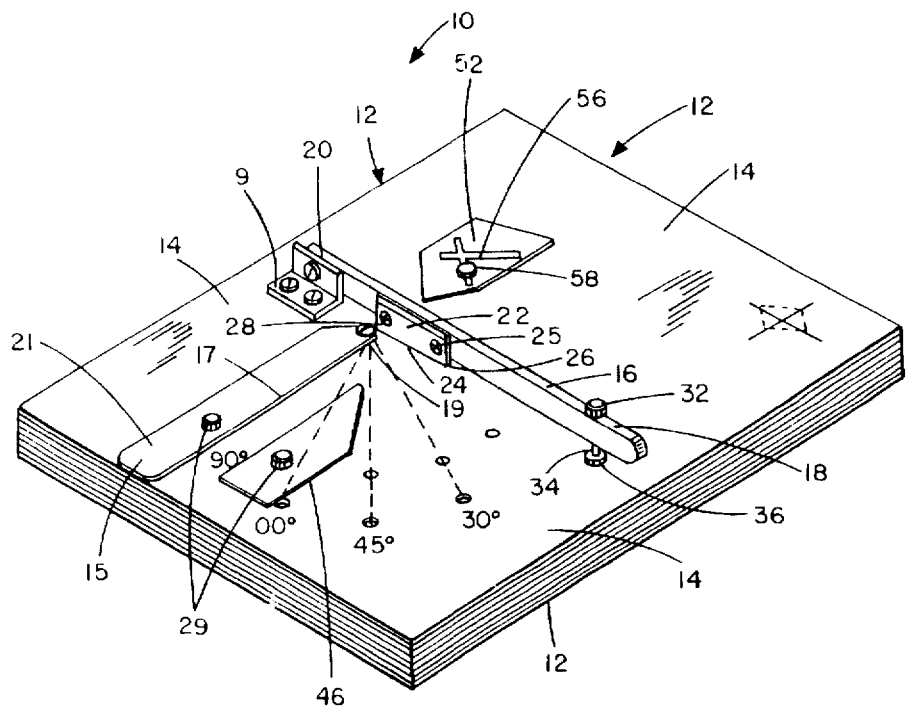
FIG. 1
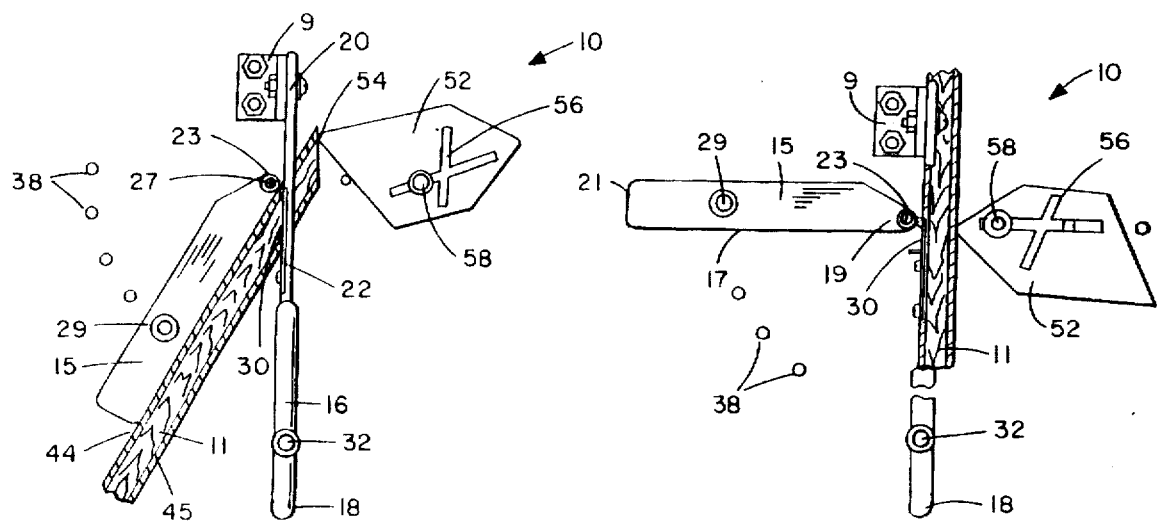
FIG. 2
FIG. 3

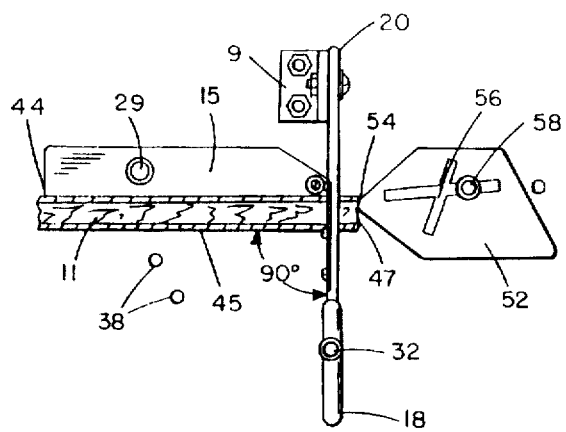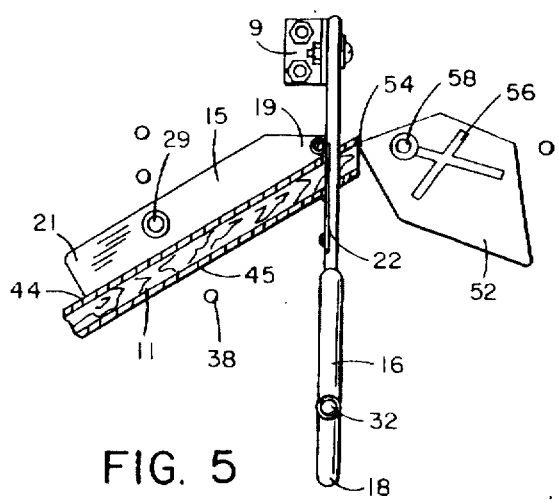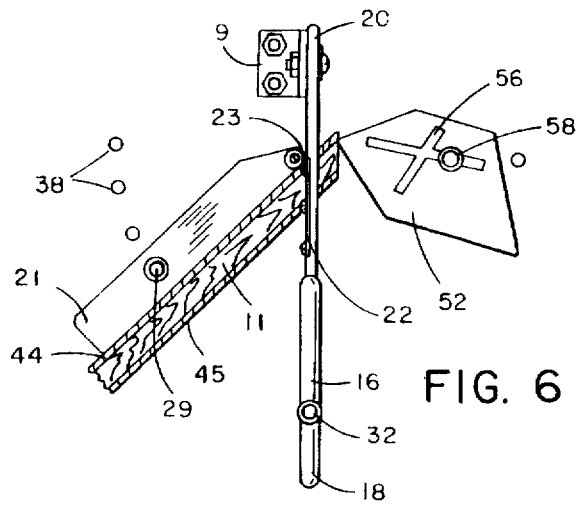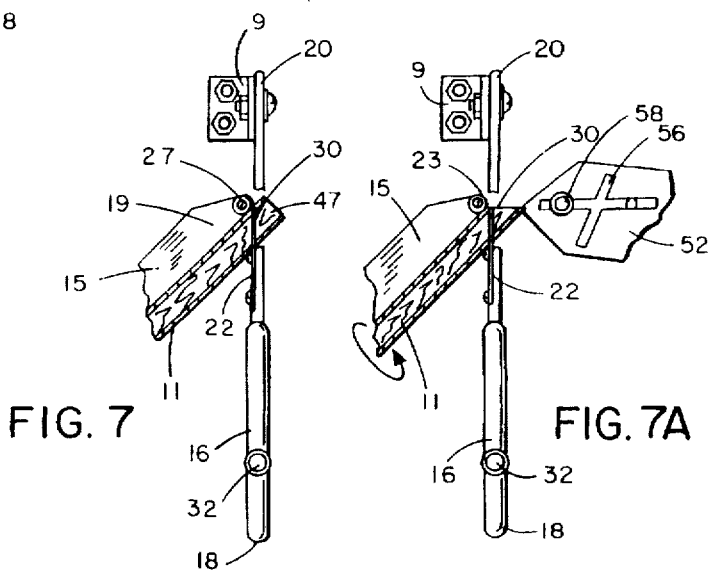

WOOD CUTTING DEVICE AND METHOD OF USING THE SAME

BACKGROUND OF THE INVENTION

1. Field of the Invention

This invention relates in general to woodworking devices and in particular to a device for cutting strips of wood into geometric shapes for use in creating parquetry.

2. Description of the Related Art

Parquetry is the term used to describe works of art consisting of pieces of wood worked into an inlaid mosaic. Pieces of wood having contrasting colors textures and grain patterns are laid in intricate geometric patterns to create fascinating works having a striking visual effect. The patterns created are often complicated symmetrical designs which provide visually appealing decoration to many articles, including furniture, cabinetwork, tables, floors, boxes, trays and others. Many beautiful and priceless pieces of furniture and cabinetwork decorated with parquetry may be found in museums throughout the world.

One method of creating parquetry is to cut thin wood veneer strips into small, simple geometric shapes such as squares, rectangles, triangles and rhomboids, or diamonds. In order to create the precise geometric patterns found in parquetry, the veneer strips must be cut into the desired geometric shapes with extreme precision. Moreover, due to the highly complicated, symmetrical nature of most parquetry it is often necessary to cut large numbers of geometric shapes having precisely identical dimensions.

Typically, the cutting of veneer strips into geometric shapes for use in parquetry is accomplished by hand. Using a sharp craft knife such as an X-ACTO brand knife, a single edge razor blade set in a handle, a cutting mat, and a protractor, the artist must cut each geometric shape from a pre-cut strip of veneer. For each geometric piece so cut, every angle and dimension must be measured, preferably with calipers, to insure that it is within the proper tolerance a difficult and time consuming process at best. Moreover, the process of cutting precise geometric shapes by hand requires a dexterity with small, sharp hand tools that is not easily acquired and that is commonly lost with age.

Accordingly, there is a need in the art for a simple device which permits the user to safely and easily cut veneer strips into geometric shapes for use in parquetry with high precision. There is a further need for a device which may be pre-set or adjusted to a particular configuration for repeatedly cutting equivalent geometric shapes.

It is, therefore, the general object of the present invention to provide a device for cutting veneer strips into precise geometric shapes for use in parquetry. It is a further object of the present invention to provide a device which may be pre-set or adjusted to a particular configuration for repeatedly cutting identical geometric shapes with high precision.

SUMMARY OF THE INVENTION

This unique material cutting device is specifically designed for accurate cutting of parquetry and mosaic wooden shapes. Precision and accuracy are required where geometric wooden shapes are assembled together to form symmetrical geometric patterns. The cutting device of the subject invention includes a blade handle mounted on a rigid base by means of a mounting bracket which permits the blade handle to rotate in a plane perpendicular to the base. A single edged razor blade is firmly mounted to the blade handle with the cutting edge directed downward. When the blade handle is lowered, the cutting edge of the razor blade engages a wood veneer strip at an angle perpendicular to the face of the strip.

The cutting device is specifically designed to be capable of cutting and maintaining accurate angles. An adjustable guide fence is provided to guide the veneer strip into position to be cut. The guide fence permits the user to maintain a constant predetermined angle between the edge of the veneer strip and the cutting blade while cutting the strip into a plurality of similar shapes. Also provided are an adjustable strip stop and an adjustable guide strip. The purpose of the strip stop is to permit the user to cut a plurality of pieces having identical lengths. The strip guide works in conjunction with the guide fence to maintain a constant angle between the edge of the veneer strip and the cutting blade. Once set in position, each of the guide fence, strip guide and strip stop may be fixed in position to permit the user to repeatedly cut identical shapes from different veneer strips.

The cutting device of the subject invention may include four standard cutting angle positions, 90-degree, 60-degree, 45-degree and 30-degree. In the preferred embodiment, the cutting device has a semicircular slot which permits a wood strip to be cut at other angles to create infinite variations of shapes from material strips. Because a variety of angles can be selected, the scope of the user's creative capabilities are greatly increased, for example, in five point patterns where angles of 18 degrees, 36 degrees and 54 degrees are required.

The foregoing and other features, aspects, and advantages of the present invention will become better understood with regard to the following description, appended claims, and accompanying drawings.

BRIEF DESCRIPTION OF THE DRAWINGS

FIG. 1 is a perspective view of the cutting device showing a plurality of holes in the base arranged in a semicircular pattern.

FIG. 2 is a plan view of the cutting device.

FIG. 3 is a plan view showing the setting of the strip length in preparation for cutting square or diamond shaped pieces.

FIG. 4 is a plan view of the cutting device configured to cut square pieces of wood.

FIG. 5 is a plan view showing the cutting device set up to cut diamond shaped pieces of wood with a 60-degree cutting angle between the blade nd the veneer strip.

FIG. 6 is a plan view showing the cutting device set up to cut diamond shaped pieces of wood with a 45-degree cutting angle between the blade and the veneer strip.

FIG. 7 and 7a is a plan view of the cutting device configured to cut triangular pieces of wood.

DETAILED DESCRIPTION OF THE PREFERRED EMBODIMENT

Figure 1A:
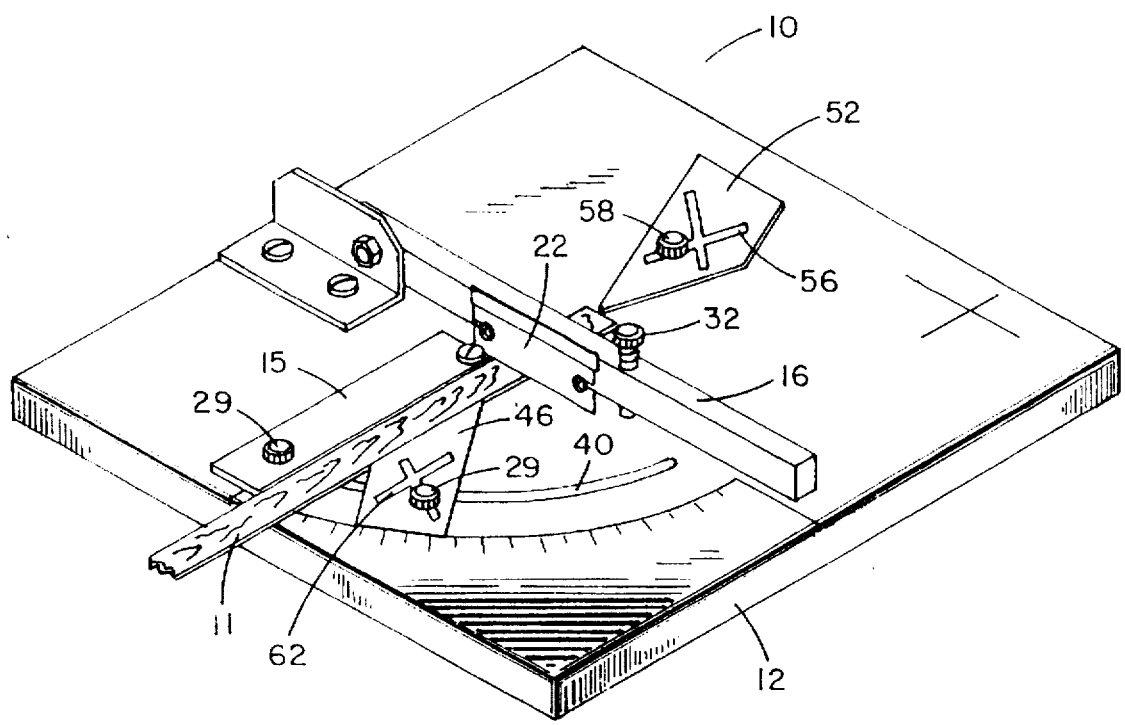
FIG. 1A is a perspective view of the cutting device showing a single semicircular slot in the base and an X-shaped slot in the strip guide.

Referring now to the drawings and first to FIG. 1, a cutting device embodying the present invention is designated generally by the reference numeral 10. The cutting device 10 includes a base 12 having a top surface 14, a blade handle 16 mounted on the top surface 14 of the base 12 and a cutting blade 22 affixed to the blade handle 16. To ensure true clean cuts, the base 12 is rigid and will not bend or warp when pressure is applied to the top surface 14. The preferred rigid base 12 is optimally cut from a sheet of rigid material, such as molded hard plastic. In the preferred embodiment, the rigid base 12 has dimensions of approximately 9"×9" and is approximately one-half inch thick.

As shown in FIG. 1, the blade handle 16 has front and back ends 18, 20 and is rotationally secured at its back end 20 to the top surface 14 of the base 12. The back end 20 of the blade handle 16 is mounted, such as by way of example, with mounting bracket 9, in a manner which permits the blade handle 16 to rotate in a plane perpendicular to the base 12. In the preferred embodiment, the blade handle 16 is a flat metal bar. However, it will be understood that the handle may be constructed from a variety of suitable materials.

A cutting blade 22 having a cutting edge 24 is firmly mounted to the blade handle 16 by means of a fastening device 25, such as by way of example, two or three machine screws or nut and bolt combination. The cutting blade 22 includes forward and rear edges 26, 28 and is positioned near the midsection of the blade handle 16 toward the back end 20. The cutting edge 24 is directed downward in a plane perpendicular to the top surface 14 of the base 12.

Figure 1B:
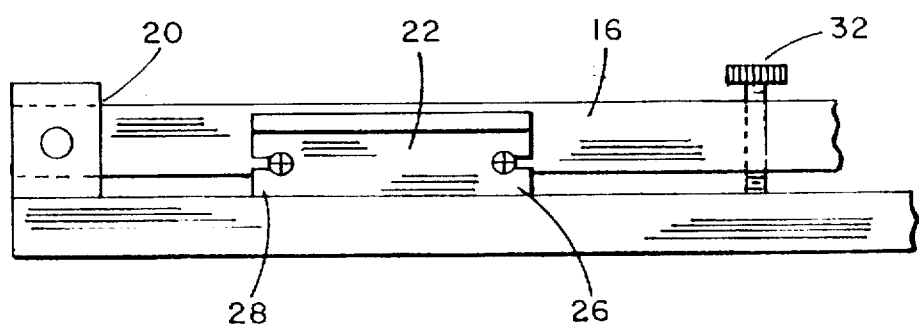
FIG. 1B is a side view showing the cutting blade in a down position parallel to the base.

When the blade handle 16 is rotated downward into the fully lowered position, the cutting edge 24 of the cutting blade 22 is rotated downward against the top surface 14 of the base 12 at an angle perpendicular to the top surface 14 of the base 12 along a line extending from the forward edge 26 of the cutting blade 22 to the rear edge 28 of the cutting blade 22 (see FIG. 1B). The line extending along the top surface 14 of the base 12 from the forward edge 26 of the cutting blade 22 to the rear edge 28 of the cutting blade 22 when the blade handle 16 is in the fully lowered position is hereinafter referred to as the "cutting line" 30.

In the preferred embodiment, an element, such as an adjustable pressure screw 32, is screwed through the front end 18 of the blade handle 16. The pressure screw 32 has a tip 34 and protrudes from the bottom of the blade handle 16, and is adjusted such that when the blade handle 16 is lowered to the point that the tip 34 of the pressure screw 32 touches the top surface 14 of the base 12, the cutting blade 22 lightly touches or remains just above, the cutting line 30. This prevents the user from forcing the cutting edge 24 into the base 12, which prevents excessive wear to the cutting blade 22 and damage to the base 12. A small metal anvil or strike plate 36 may be positioned on the top surface 14 of the base 12 immediately beneath the pressure screw 32 to prevent damage or wear to the base 12 from the pressure screw 32.

The cutting device 10 of the subject invention also includes an adjustable guide fence 15, preferably in the shape of a flat metal strip, having at least one straight edge 17 provided to guide a wood veneer strip 11 into position to be cut. The guide fence 15 has opposite ends 19, 21 and lays flat on the top surface 14 of the base 12 and is rotationally attached to the base 12 at one end 19 of the guide fence 15. The affixed end 19 of the guide fence 15 is tapered into a rounded point having a rounded edge 23, such that the radius of the rounded point is equal to the distance between (a) the point or axis of rotation 27 about which the guide fence 15 rotates and (b) the point at which the rear edge 28 of the cutting blade 22 touches the base 12 when the blade handle 16 is in the fully lowered position. Thus, as the guide fence 15 is rotated along the surface of the base 12 about the axis of rotation 27, the rounded edge 23 of the affixed tapered end 19 of the guide fence 15 remains tangent to the cutting line 30 at the point at which the rear edge 28 of the cutting blade 22 touches the base 12 when the blade handle 16 is in the fully lowered position.

Once the guide fence 15 has been rotated into position in the desired location, it is secured in place by means of a fastener or thumb screw 29 which extends through the guide fence 15 and into one of a plurality of pre-drilled threaded holes 38 in the base 12 arranged in a semicircular pattern having as its center point the axis of rotation 27 of the guide fence 15. The holes 38 are positioned for precisely and accurately cutting the veneer strip 11 at various predetermined angles, such as at 90-degree, 60-degree, 45-degree and 30-degree angles. (See FIGS. 2–7). In the preferred embodiment, the plurality of threaded holes 38 is replaced by a single semicircular slot 40 through which the thumb screw 29 extends as shown in FIGS. 1 and 1A. Such an arrangement permits continuous adjustment of the angle between the guide fence 15 and the cutting line 30 between 0 and 90 degrees. Thus, infinite variations of shapes from material strips may be created.

The guide fence 15 permits the user to maintain a constant predetermined angle between the veneer strip 11 and the cutting blade 22 while cutting the strip 11 into a plurality of similarly shaped pieces. In operation, the blade handle 16 is raised such that the cutting blade 22 is elevated sufficient distance from the base 12 to permit a veneer strip 11 to pass beneath the cutting blade 22. The user then places a veneer strip 11 flat on the top surface 14 of the base 12, with one side edge 44 of the strip 11 placed flush against the guide fence 15. The veneer strip 11 is then pushed along the guide fence 15 a predetermined distance across the cutting line 30. Once the veneer strip 11 has been positioned in the desired location, the blade handle 16 is lowered, causing the cutting edge 24 of the cutting blade 22 to cut the veneer strip 11 along the cutting line 30. (See FIGS. 2 and 4–7).

In a preferred embodiment, the cutting device 10 is provided with an adjustable strip guide 46, which works in conjunction with the guide fence 15 to maintain a constant angle between the veneer strip 11 and the cutting blade 22. As shown in FIG. 1, the strip guide 46 is positioned parallel to the guide fence 15 against the opposite side edge 45 of the veneer strip 11. The strip guide 46 optimally has formed therein an X-shaped slot 62 (see FIG. 1A), through which a fastener or thumb screw 29 extends into one of a plurality of threaded holes 38 in the base. The strip guide 46 may thus be adjusted to a number of different positions.

In a further preferred embodiment, an adjustable strip stop 52 is provided, to permit the user to cut a plurality of pieces having identical lengths. As shown in FIGS. 1–6, the strip stop 52 is positioned on the top surface 14 of the base 12 across from the guide fence 15 on the opposite side of the blade handle 16. In operation, the veneer strip 11 is slid along the guide fence 15 and across the cutting line 30 until the top edge 47 of the veneer strip 11 comes into contact with the strip stop 52. One end of the strip stop 52 is optimally provided with a tapered point 54 which acts upon the veneer strip 11. This assures that each geometric piece will be cut to the same length. The strip stop 52 has formed therein an X-shaped slot 56 similar to that formed in the strip guide 46. (See FIGS. 1–6). The strip stop 52 is similarly attached to the base 12 by means of a fastener or thumb screw 58 which extends through a predrilled hole 60 (not shown) in the base 12. The screw 58 may be loosened to permit adjustment of the strip stop 52 and tightened once strip 11 has been set in the desired position.

When cutting square or diamond shaped pieces, the strip stop 52 is first positioned so that the tapered point 54 lies in line parallel to the cutting line 30 and located a distance from the cutting line 30 approximately equal to the width of the veneer strip 11 in use. The strip stop 52 is positioned in the proper location by positioning the veneer strip 11 against the rounded edge 23 of the guide fence 15 and in line with the cutting line 30 as shown in FIG. 3. The strip stop 52 is then moved into position as shown on FIG. 3 and the thumb screw 58 is tightened to fix the strip stop 52 into place.

Square pieces are then cut as shown in FIG. 4 by adjusting the guide fence 15 to the 90-degree location, placing the veneer strip 11 under the cutting blade 22 and against the tapered point 54 of the strip stop 52. The blade handle 16 is then lowered to make the cut.

Rectangular pieces are cut in a similar manner, except that the distance between the strip stop 52 and the cutting line 30 differs from the width of the veneer strip 11 as appropriate. Diamond pieces are cut in a similar manner to squares by adjusting the guide fence 15 to the appropriate angle as shown in FIGS. 5 an 6. It will be understood that the guide fence 15 may be set to any angle between 0 and 90 degrees, providing the ability to cut a wide variety of diamond shapes. Triangular pieces are likewise cut in a similar manner, except that, as shown in FIG. 6, the veneer strip 11 is flipped over after each cut.

A wide selection of wood veneer strips is available for use in fabricating parquetry using the present invention, including wood veneers of varying colors, shades and grain configurations. Wood veneers having straight, close grains are ideal for parquetry. Veneers having many burls and knots, although unusual in appearance, are difficulty to use for parquetry as they are prone to splitting and breaking. The color of wood veneers ranges from white (holly) to black (ebony). It is not recommended to use the cutting device of the present invention the cut ebony due to its extreme hardness which may damage the cutting mechanism.

Wood veneers usually range from 1/28" to 1/40" in thickness depending upon the species of wood, and are found in a variety of lengths and widths. Typically, soft woods such as holly, mahogany, avodire, prima vera, butternut and sapele are from 10" to 18" wide. Hardwoods such as ebony, satinwood and rosewood are typically from 4" to 6" wide.

It will be understood by those skilled in the art that it is preferred to use wood veneer strips which have been pre-cut to precise widths. Variations in the width of the strips will result in distorted patterns when the pieces are assembled. Thus, it is important that great care be taken when cutting the strips.

Cutting the veneer strips to the desired width is best accomplished by means of a mini-saw, the use of which is well known by those skilled in the art. Although mini-saws are expensive, an extremely high tolerance of +−0.002" can be obtained with such tools. The cost of a mini-saw is well justified if large numbers of projects are anticipated.

It is also possible to cut wood veneers to width using strip cutting board, which is a manual cutting device also well-known to those skilled in the art.

While specific embodiments and features of the invention have been disclosed herein, it will be readily understood that the invention encompasses all enhancements and modifications within the scope and spirit of the following claims.

What is claimed is:

1. A cutting device for precisely cutting wood veneer strips into geometric shapes, said device comprising:

a rigid base having a flat top surface;

a blade handle having opposite ends, said blade handle rotationally attached at one end to said top surface and said opposite end being free, said handle being rotational in a plane perpendicular to the top surface of the base;

a cutting blade positioned along a portion of and affixed to said blade handle and directed downward for engaging and cutting a wood veneer strip;

an adjustable guide fence attached to the top surface of said base, said guide fence movable for guiding the wood veneer strip into a position to be cut at a predetermined angle by the cutting blade; and an adjustable strip stop attached to the top surface of said base and positioned to contact an outer end of a veneer strip for cutting a plurality of strips having identical lengths.

2. The cutting device of claim 1, wherein said guide fence is adjustable to various positions to define a predetermined angle between the guide fence and the cutting blade for positioning a veneer strip on the cutting device and making a cut at a predetermined angle.

3. The cutting device of claim 2, wherein said predetermined angle is at an angle between 0-degree and 90-degree.

4. The cutting device of claim 2, said adjustable guide fence having opposite ends, one end being rotationally attached to the base whereby said guide fence is rotational in a plane horizontal to the top surface of the base.

5. The cutting device of claim 4, wherein said attached end includes a tapered rounded edge and has an axis of rotation about the attached tapered rounded edge.

6. The cutting device of claim 5, further comprising a means for releasably securing said adjustable guide fence in place at various positions on the top surface of the base for maintaining a constant predetermined angle between said cutting blade and the veneer strip.

7. The cutting device of claim 6, wherein said means for releasably securing the adjustable guide fence comprises:

a semi-circular slot in the base having a center of rotation defined by the axis of rotation of said guide fence; and a fastener extending through the slot and retaining the adjustable guide fence in place along the slot to define a predetermined angle.

8. The cutting device of claim 7, wherein said fastener is a thumb screw.

9. The cutting device of claim 6, wherein said means for releasably securing the adjustable guide fence comprises:

a plurality of holes in the base arranged in a semi-circular pattern having a center of rotation defined by the axis of rotation of said guide fence; and a fastener adapted to extend through each hole for retaining the adjustable guide fence in place at various predetermined angles defined by said holes.

10. The cutting device of claim 1, said strip stop having a rounded point for engaging a veneer strip.

11. The cutting device of claim 10, further comprising a means for adjustably securing said strip stop in place on the base, wherein said strip stop is adjustably positioned vertically and horizontally across the top surface of the base.

12. The cutting device of claim 11, wherein said means for adjustably securing the strip stop includes:

an X-shaped slot in the strip stop;

a fastener extending through the X-shaped slot for releasably securing said strip stop in place; and at least one hole in the base for receiving said fastener.

13. The cutting device of claim 1, further comprising an element protruding through the opposite free end of the blade handle perpendicular to the flat top surface, said element having a tip and being positioned whereby said tip contacts the flat top surface and prevents the cutting blade from being forced into the base.

14. The cutting device of claim 13, wherein said element is a pressure screw.

15. The cutting device of claim 13, further including a strike plate secured to the base and positioned beneath the element for preventing damage or wear to the base from the tip of the element contacting the base.

16. The cutting device of claim 1, further comprising an adjustable strip guide attached to the top surface of said base, said strip guide positioned to work in conjunction with said guide fence for maintaining a constant predetermined angle between the veneer strip and the cutting blade.

17. The cutting device of claim 16, further comprising a means for adjustably securing said strip guide in place on the base.

18. The cutting device of claim 17, wherein said means for adjustably securing the strip guide includes:
   an X-shaped slot in the strip guide;
   a fastener extending through the X-shaped slot for releasably securing said strip guide in place; and
   at least one hole in the base for receiving said fastener.

19. A method for cutting strips of wood into geometric shapes using a cutting device including a base having a top surface, a blade handle attached to the top surface and having a cutting blade, an adjustable guide fence attached to the top surface of the base and an adjustable strip guide adapted to work in conjunction with the guide fence for maintaining a constant angle between the veneer strip and the cutting blade, said method comprising the steps of:
   raising the blade handle a sufficient distance from the base for permitting a strip of wood to pass beneath the cutting blade;
   positioning the guide fence at a predetermined angle;
   placing a veneer strip having opposite side edges flat on the top surface of the base, wherein one side edge of the veneer strip is flush against the guide fence;
   positioning the adjustable strip guide flush against the opposite side edge of the veneer strip;
   pushing the veneer strip along the guide fence a predetermined distance under the cutting blade; and
   lowering the blade handle until the cutting blade cuts the veneer strip at the predetermined angle.

20. The method of claim 19, wherein the cutting device further includes an adjustable strip stop for cutting a plurality of veneer strips to an identical length, said step of pushing the veneer strip along the guide fence under the cutting blade further comprising the step of pushing the veneer strip along the guide fence until the top edge of the veneer strip engages the strip stop.

21. The method of claim 20, wherein the cutting device further includes a pressure screw extending through the bottom of the blade handle for preventing the cutting blade from being forced into the base, said method further comprising the step of lowering the blade handle until the pressure screw contacts the top surface of the base.

22. A method for cutting strips of wood into square or diamond shapes using a cutting device including a base with a top surface, a blade handle attached to the top surface and having a cutting blade, an adjustable guide fence having a rounded front end rotatably attached to the top surface, and an adjustable strip stop attached to the top surface of the base, said method comprising the steps of:
   positioning a veneer strip having opposite side edges on the top surface, wherein the rounded front end of the guide fence is against one side edge of the strip and the strip is adjacent and parallel to the cutting blade;
   moving the strip stop against the other side edge of the veneer strip, securing the strip stop in place and removing the veneer strip;
   adjusting the guide fence to a predetermined angle;
   raising the blade handle a sufficient distance from the base for permitting the veneer strip to pass beneath the cutting blade;
   placing the veneer strip on the top surface of the base, wherein one side edge of the veneer strip is flush against the guide fence;
   pushing the veneer strip along the guide fence under the cutting blade until the strip engages the strip stop; and
   lowering the blade handle until the cutting blade cuts the veneer strip at the predetermined angle.

23. The method of claim 22, wherein the guide fence is adjusted to a 90-degree location to create a square shape.

24. The method of claim 23, wherein the guide fence is adjusted to a 60-degree location to create a diamond shape.

25. The method of claim 24, wherein the guide fence is adjusted to a 45-degree location to create a diamond shape.

26. A method for cutting strips of wood into triangular shapes using a cutting device including a base with a top surface, a blade handle attached to the top surface and having a cutting blade, an adjustable guide fence having a rounded front end rotatably attached to the top surface, and an adjustable strip stop attached to the top surface of the base, said method comprising the steps of:
   adjusting the guide fence to a predetermined angle;
   raising the blade handle a sufficient distance from the base for permitting the veneer strip to pass beneath the cutting blade;
   placing the veneer strip on the top surface of the base, wherein one side edge of the veneer strip is flush against the guide fence;
   pushing the veneer strip along the guide fence a predetermined distance under the cutting blade;
   lowering the blade handle until the cutting blade cuts the veneer strip at the predetermined angle and creates an angle point on the corner of the veneer strip across from the side edge which is flush against the guide fence;
   flipping the veneer strip over and positioning the strip so that the cutter blade bisects the angle point;
   moving the strip stop up to contact the veneer strip and securing the strip stop in place; and
   lowering the blade handle until the cutting blade cuts the veneer strip.

27. The method of claim 26, wherein the guide fence is adjusted to a 60-degree location.

28. The method of claim 27, wherein the guide fence is adjusted to a 45-degree location.

29. The method of claim 28, wherein the guide fence is adjusted to a 30-degree location.

30. A cutting device for precisely cutting wood veneer strips into geometric shapes, said device comprising:
   a rigid base having a flat top surface;
   a blade handle having opposite ends, said blade handle rotationally attached at one end to said top surface, said handle being rotational in a plane perpendicular to the top surface of the base;
   a cutting blade affixed to said blade handle and directed downward for engaging and cutting a wood veneer strip;

an adjustable guide fence attached to the top surface of said base, said guide fence movable for guiding the wood veneer strip into a position to be cut at a predetermined angle by the cutting blade; and an adjustable strip guide attached to the top surface of said base, said strip guide positioned to work in conjunction with said guide fence for maintaining a constant predetermined angle between the veneer strip and the cutting blade.

31. The cutting device of claim 30, wherein said guide fence is adjustable to various positions to define a predetermined angle between the guide fence and the cutting blade for positioning a veneer strip on the cutting device and making a cut at a predetermined angle and wherein said predetermined angle is at an angle between 0-degree and 90-degree.

32. The cutting device of claim 31, further comprising an adjustable strip stop attached to the top surface of said base and positioned to contact an outer end of a veneer strip for cutting a plurality of strips having identical lengths.

33. A cutting device for precisely cutting wood veneer strips into geometric shapes, said device comprising:

a rigid base having a flat top surface;

a blade handle having opposite ends and a midsection, said blade handle rotationally attached at one end to said top surface, said handle being rotational in a plane perpendicular to the top surface of the base;

a sharp cutting blade positioned near the midsection and affixed to said blade handle and directed downward at a low angle for engaging and cutting a wood veneer strip;

an adjustable guide fence attached to the top surface of said base, said guide fence movable for guiding the wood veneer strip into a position to be cut at a predetermined angle by the cutting blade; and an adjustable strip stop attached to the top surface of said base, said strip stop having a tapered point and positioned to contact an outer end of a veneer strip for cutting a plurality of strips having identical lengths.

34. The cutting device of claim 33, further comprising a means for vertically and horizontally adjusting said strip stop across the top surface of the base and adjustably securing said strip stop in place on the base.

35. The cutting device of claim 34, wherein said strip stop comprises a plate having a flat, geometric shape.

36. The cutting device of claim 35, wherein said means for adjustably securing the strip stop includes:

an X-shaped slot in the strip stop;

a fastener extending through the X-shaped slot for releasably securing said strip stop in place; and at least one hole in the base for receiving said fastener.

37. A cutting device for precisely cutting wood veneer strips into geometric shapes, said device comprising:

a rigid base having a flat top surface;

a blade handle having a front end, a back end and a middle section, said blade handle rotationally attached at the back end to said top surface, said handle being rotational in a plane perpendicular to the top surface of the base;

a cutting blade positioned near the midsection toward the back end and affixed to said blade handle and directed downward for engaging and cutting a wood veneer strip; and an adjustable guide fence attached to the top surface of said base, said guide fence movable for guiding the wood veneer strip into a position to be cut at a predetermined angle by the cutting blade.

38. The cutting device of claim 37, wherein said cutting blade is a razor blade.

* * * * *